US006760795B2

(12) United States Patent
Goudie et al.

(10) Patent No.: US 6,760,795 B2
(45) Date of Patent: Jul. 6, 2004

(54) DATA QUEUE SYSTEM

(75) Inventors: Alistair Goudie, Lincoln (GB); Colin Helliwell, Lincoln (GB); Marcus Jones, Lincoln (GB)

(73) Assignee: Zarlink Semiconductor Limited (GB)

( * ) Notice: Subject to any disclaimer, the term of this patent is extended or adjusted under 35 U.S.C. 154(b) by 237 days.

(21) Appl. No.: 10/035,000

(22) Filed: Dec. 28, 2001

(65) Prior Publication Data

US 2002/0133648 A1 Sep. 19, 2002

(30) Foreign Application Priority Data

Dec. 29, 2000  (GB) ............................................ 0031761
Jan. 29, 2001  (GB) ............................................ 0102278

(51) Int. Cl.[7] .................................................. G06F 3/06
(52) U.S. Cl. ........................... 710/56; 710/30; 710/39; 710/52; 711/113; 711/209
(58) Field of Search ............................... 710/1, 17, 18, 710/31, 30, 35, 39, 52–57, 112, 5; 712/225; 711/108, 133, 209

(56) References Cited

U.S. PATENT DOCUMENTS

| 5,237,564 | A |   | 8/1993  | Lespagnol et al. | ......... 370/60.1 |
| 5,410,650 | A | * | 4/1995  | Sasaki et al.    | ............... 395/200 |
| 5,809,263 | A | * | 9/1998  | Farmwald et al.  | .......... 395/309 |
| 5,870,627 | A | * | 2/1999  | O'toole et al.   | ............... 395/842 |
| 6,061,690 | A | * | 5/2000  | Nori et al.      | ................... 707/103 |
| 6,308,238 | B1| * | 10/2001 | Smith et al.     | ................ 710/310 |
| 6,453,369 | B1| * | 9/2002  | Imamura et al.   | ............... 710/36 |
| 6,532,503 | B1| * | 3/2003  | Lindeborg et al. | ............ 710/52 |

FOREIGN PATENT DOCUMENTS

| EP | 0 273 083 | 12/1986 |
| EP | 0 241 129 | 10/1987 |
| EP | 0 382 699 | 1/1990  |
| GB | 1 454 290 | 12/1972 |
| GB | 2 267 588 | 12/1993 |
| GB | 2 330 479 | 4/1999  |
| GB | 2 350 533 | 11/2000 |
| WO | WO 84/00835 | 3/1984 |
| WO | WO 88/07298 | 9/1988 |

OTHER PUBLICATIONS

Aweya, "On the design of IP routers Part 1: Router Architectures," *Journal of Systems Architecture*, 46:483–511, 2000.

Hodson et al., "Skew detection and compensation for internet audio applications," *Int. Conf. On Multimedia and Expo 2000, ICME 2000*, New York, 3:1687–1690, 2000.

"Packetized Voice Recorder," IBM Technical Disclosure Bulletin, vol. 30, No. 12, pp 257–265, 1988.

"Sequential access buffer control," IBM Technical Disclosure Bulletin, vol. 9. No. 4, pp 374–375, 1966.

* cited by examiner

*Primary Examiner*—Jeffrey Gaffin
*Assistant Examiner*—Rijue Mai
(74) *Attorney, Agent, or Firm*—Gray, Cary, Ware & Freidenrich, LLP

(57) ABSTRACT

A data queue system comprises plural memory blocks defined in memory, and a queue which comprises a number of memory blocks each including a link to the following block in the data queue. A queue descriptor includes identities which identify: the final block in the queue, the memory location where the most recent read commit occurred (and optionally an offset from a predetermined location in that block), the memory location where the most recent write commit occurred (and optionally an offset from a predetermined location in that memory block), the size of the blocks, the memory location the most recent write occurred, the number of unused blocks, the number of blocks which contain data to be read, the type of data queue, the memory location where the most recent read occurred and the number of blocks which have been read since the most recent read commit.

11 Claims, 1 Drawing Sheet

DATA QUEUE SYSTEM

CROSS-REFERENCES TO RELATED APPLICATIONS

This application claims a benefit of foreign priority under 35 U.S.C. 119(a–d) from GB 0031761.0, filed Dec. 29, 2000, and GB 0102278.9, filed Jan. 29, 2001, the entire contents of both of which are hereby expressly incorporated by reference for all purposes.

FIELD OF THE INVENTION

This invention relates to a data queue system.

SUMMARY OF THE INVENTION

In accordance with the invention, there is provided a data queue system comprising: plural memory blocks defined in memory; a data queue comprising a number of memory blocks, each non-final memory block including a link to the following block in the data queue and, a queue descriptor stored in memory, the queue descriptor comprising: a first identifier identifying the final block in the queue; a second identifier identifying the memory location where the most recent read commit occurred and, a third identifier identifying the memory location where the most recent write commit occurred.

This invention can allow both hardware and software to interact with the queue system, and the queue descriptor in particular. This invention can also allow a number of queued to be set up in the memory which is not limited by hardware.

In the embodiments, a read commit occurs as a consequence of receipt of an acknowledgement that data read out of a queue is no longer required. Similarly, a write commit occurs as a consequence of receipt of an acknowledgement that data occurs as a consequence of receipt of an acknowledgement that data written to a queue is to be made available for reading.

Embodiments of the present invention will now be described by way of example only with reference to the accompanying drawings.

DETAILED DESCRIPTION OF THE PREFERRED EMBODIMENTS

Figure 1:
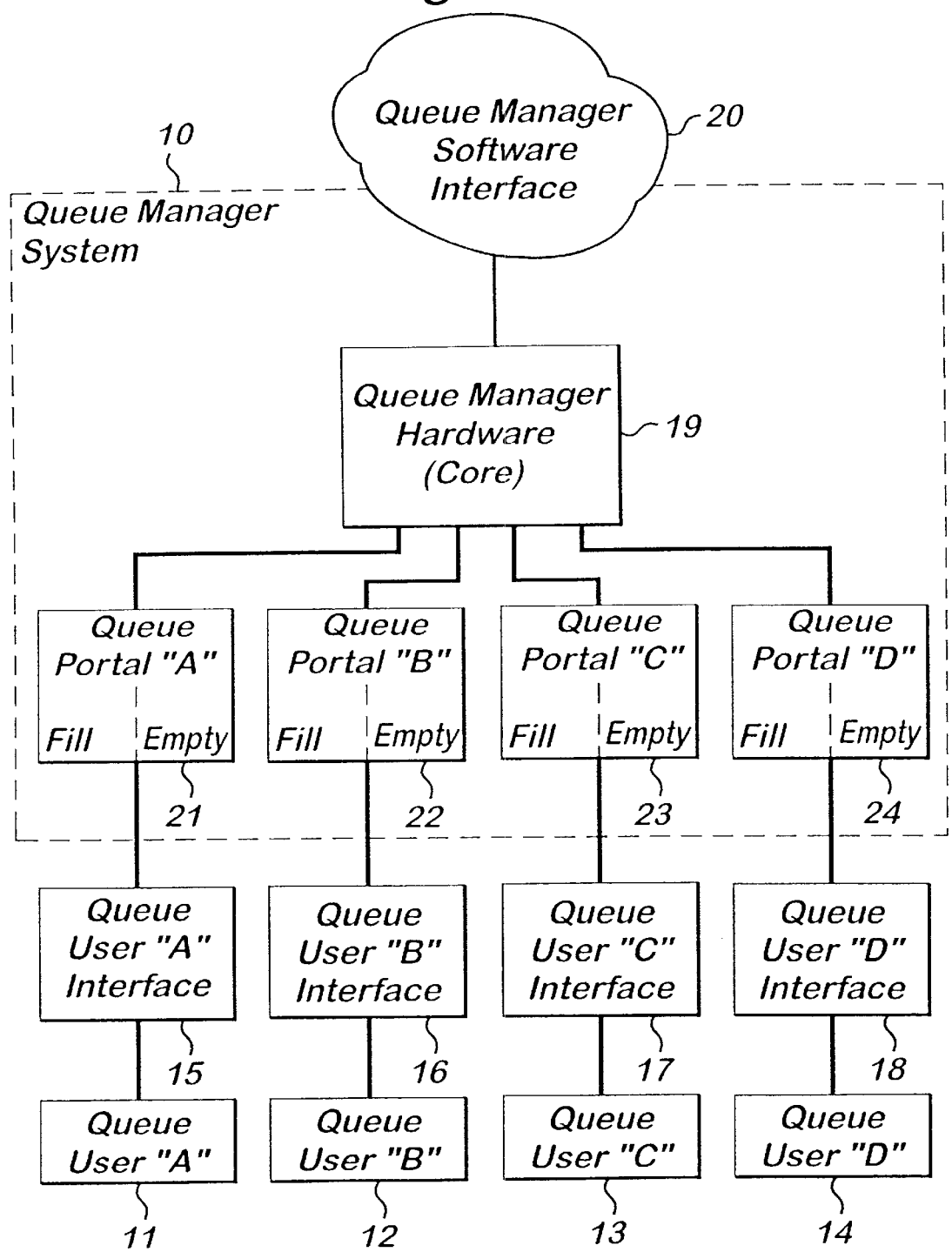
FIG. 1 shows a queue manager system with four queue users.

Referring to FIG. 1, a queue manager system 10 is shown connected to first to fourth queue users 11–14 via a respective one of first to fourth hardware queue user interfaces 15–18. The queue manager system 10 comprises a hardware queue manager core 19, which is controlled by software through a software interface 20. The queue manager core 19 is connected to each of the queue user interfaces 15–18 via a respective one of first to fourth queue portals 21–24 and a common bus (not shown).

The software interface 20 is responsible for creating and destroying queues, for resizing queues, and for supplying the memory blocks used in the queues. The principle task of the queue manager core 19 is to re-allocate 'used blocks' back onto the tails of queues. The queue manager core 19 also includes a bus arbiter (not shown) that controls how and when parallel hardware and software functions can get access to the bus (not shown).

The queue portals 21–24 provide access to the queues. Each queue portal 21–24 comprises two parts. One part can be used to write to a queue, the other part can be used to read from a queue (each part can be accessing different queues). Although only four queue portals 21–24 are shown, there is no limit to the number of portals that could be used. The main constraint on the number of portals is the worst case bus bandwidth required by them.

One queue portal 21–24 is required for each queue user 11–14. A queue user 11–14 can access multiple queues, and can simultaneously read from one queue whilst writing to another queue. In this case, the tasks are simultaneous but bus accesses are made sequential by the bus arbiter. However, each time a queue user 11–14 wants to read or write to or from a different queue, it must tell its queue portal 21–24 to unload the current queue pointers and to then load new queue pointers.

Each queue user 11–14 is a standard component or function with a direct memory access (DMA) capability. Therefore, each queue user 11–14 requires its queue user interface 15–18 to translate DMA request and acknowledge signals into a standard set of signals recognised by the queue portals 21–24. In some applications this is a simple signal translation, whilst in other applications the interface 15–18 adds or removes data, to translate to or from an application specific packet format.

The basic building block of asynchronous queues is a block of random access memory (RAM) (not shown). The amount of RAM available to the queue manager system 10 is split into lots of small memory blocks of the same size, in order to avoid the overhead of storing the memory 'block size' with every memory block. Alternatively, different queues could use different memory block sizes, although this would complicate the software which creates and re-sizes queues. In this embodiment, the memory blocks are 64 bytes long.

Every memory block starts with a 'link field', which is a pointer to the address of the link field of the next memory block. The memory used by a queue is made up of a number of memory blocks which can be distributed anywhere in the RAM, and which are linked together by link fields. This queue manager system 10 only uses unidirectional link fields, so the QMS is able only to search forwards through blocks. If the current block is the last link in the chain, its link field contains all ones (=−1). Alternatively, bidirectional link fields could be used, albeit with additional complexity and with reduced memory use efficiency.

There are also two implementation dependent constraints. The first is that all memory blocks (and therefore link fields) start on an even byte boundary. The second constraint is that the maximum RAM size is 64 kbytes. These two constraints mean that the link field can be read or written in one bus cycle.

Immediately after the link field is a 'block control' field. This contains a length field indicating how many information bytes are currently stored in the block, and four control bits. The four most significant bits (MSBs) of the block control field constitute the control bits, which indicate boundaries in the data flow. The length field is stored in the least significant bits (LSBs) of the block control field.

A memory block is shown in Table 1:

TABLE 1

| Link Field | |
|---|---|
| Control (4-bits) | Length (12-bits) |
| Data ... (High byte, Low byte) | |

Many communications systems deal with packets of data rather than a continuous data stream. The queue manager system 10 identifies multiple types of packet boundaries by using the four control flags in each memory block. These control flags are the 4 MSBs of the block control field. If the most significant control bit is set, it means the first information byte in the memory block is the start of a packet. The remaining three control bits indicate other types of boundaries. The next MSB indicates transport packet boundaries, and the next bit indicates application packet boundaries. If the three LSBs were used without the MSB, the system would not be able to indicate where in the memory block the boundary occurred.

If, when a queue user 11–14 is writing to its queue portal 21–24, it writes to the MSB of the control flags, the queue portal stops writing to the current memory block, and advance its pointers (not shown) to the link field of the next memory block. When a queue user 11–14 asks a queue portal 21–24 how many bytes of data are available, the queue user 11–14 also supplies the required number of bytes, and applies a mask to the control field. The queue portal 21–24 then searches through the queue until either it reaches the set of control flags identified by the mask, it finds the required number of bytes, or it reaches the end of the data available, whichever occurs first.

This mechanism allows control information to be included in the data stream at the start of a data packet. The queue user interface 15–18 that subsequently reads the data out of the queue is then able to extract the control information.

Where the data steam is a continuous data stream, the control flags are not used, i.e. they are always zero.

A standard asynchronous queue has a defined number of memory blocks allocated to it. If data is consumed more quickly than it is added to the queue, the queue may become empty. The blocks allocated to the queue will be unused, but unavailable to other queues. Meanwhile, another queue may be receiving too much data. The queue will be filled, and then the sender must either be stopped, or the data will be lost. This type of queue is referred to as a 'single queue'. The advantage of this type of queue is that the resources available to a queue are defined. In a system that dynamically re-allocates memory blocks as required, if a queue is slow to empty it could utilise all the available memory blocks. In this case, all the other queues may be stopped because there are no more memory blocks available.

The queue manager system 10 supports dynamic memory allocation, using 'grouped queues'. A grouped queue consists of a number of 'element queues' and a 'resource queue'. The element queues are the same as single queues except that there is a difference in the number of spare blocks allocated to element queues. Data is read to and written from element queues. The resource queue is, in effect, a linked list of spare memory blocks. All of the element queues in a grouped queue use memory blocks of the same size.

When memory blocks are released from the head of a single queue, they are re-allocated to the tail of the same queue, unless there has been a request to reduce the size of the queue. When memory blocks are released from the head of an element queue, they are usually allocated to the resource queue. While an element queue is not loaded for writing, it does not have any 'empty blocks'. The tail of the element queue points to the same memory block that the last 'committed write' points to. When a queue portal 21–24 loads an element queue for writing, the resource queue is linked onto the tail of the element queue, making all the blocks in the resource queue available. When the queue portal 21–24 unloads an element queue (at which point it will do a commit or discard), any spare memory blocks are removed from the element queue, and re-allocated to the resource queue.

The main constraint of this system is that only one element of a grouped queue may be written to at any one time. Since the whole resource queue is added to the active element. In most instances, a single queue portal 21–24 writes to the grouped queue, and, therefore, there is only ever one element queue loaded for writing. There is, in theory, no limit to the number of single or grouped queues that can be created. The main constraint is the memory resources required.

The other type of queue is an isochronous (ISO) queue. Isochronous data is time critical data, such as telephone speech data. An ISO queue uses different control mechanisms, which are managed by different hardware. ISO queue control mechanisms can be an additional component or an alternative component to a queue portal 21–24. An ISO queue uses a single contiguous block of memory rather then the linked memory blocks used by asynchronous queues. This memory area is typically quite small, for example 32–256 bytes. An ISO queue provides a small buffer space to isolate queue users that generate and/or use data in a jittery or bursty way. If an ISO queue becomes full, the oldest data is disposed of by overwriting it. This type of queue is not used if data integrity is important. If the queue becomes empty or effectively empty, the data most recently read from the queue is read again.

Typically, isochronous data is linear pulse code modulation (PCM) data, which comprises samples of an analogue signal, such as a voice recording. In this case, the data read again from the queue consists of a number of bytes of data which when reconstructed into an audio signal sounds the same as or similar to sounds immediately before and after it. This is much less noticeable than a gap in an audio signal.

Where isochronous data is data such as continuous variable slope delta (CVSD) modulation data, special arrangements are made to ensure that the mean of the reconstructed signal remains at zero, since otherwise saturation or digital overflow may occur. This type of data, and types similar thereto, is accommodated in one of two ways. Firstly, the data read again may be processed to provide a zero offset. It will be appreciated that there are many ways of achieving this. Secondly, data may be generated which corresponds to a sequence of alternate increments and decrements, i.e. a small amplitude sinusoid signal is generated in place of data being read again.

As described above, many memory blocks are linked to form a chain of blocks in which a sequence of data is stored. A queue descriptor is a set of pointers and control fields that control how the chains of blocks are used and managed. The queue descriptors are stored in a different part of memory. When the software interface 20 creates a queue, it also creates a queue descriptor. A queue is identified by the address of the start of the corresponding queue descriptor. When a queue user 11–14 accesses a queue through a queue portal 21–24, it provides the address of the start of the descriptor, which is hereafter termed the queue identifier (QID).

The single queues and element queues use similar queue descriptors. This type of queue descriptor is made-up of a number of sub-descriptors and access control bits. The resource queue uses a simplified version of a queue descriptor. The access control bits in the queue descriptors ensure that, at any point in time, only one queue portal or the software interface 20 is allowed to modify a field in the descriptor.

Table 2 illustrates the fields in single and element queue descriptors, and where the field is stored in memory, for an asynchronous queue:—

TABLE 2

| Address | Lock bit | | High byte | Low byte |
|---|---|---|---|---|
| QID | 0 | RmW | Blocks to remove | Lock control |
| QID + 2 | | | ----- | Block size (12-bits) |
| QID + 4 | | ----- | Tail of blocks | |
| QID + 6 | RmW | | Used blocks | Empty blocks (/Used Threshold) |
| QID + 8 | 1 | | Type (Single = -1/Element = RID) | |
| QID + 10 | 1 | | Committed Tail Block | |
| QID + 12 | 1 | | ----- | Committed Tail Offset (12-bits) |
| QID + 14 | 2 | | Committed Head Block | |
| QID + 16 | 2 | | ----- | Current Head Offset (12-bits) |
| QID + 18 | 2 | | Committed Head Block | |
| QID + 20 | 2 | | ----- | Current Head Offset (12-bits) |
| QID + 22 | 2 | | ----- | Blocks to release |

Table 3 illustrates the fields in a resource queue descriptor, in which RID is the resource queue identifier.

TABLE 3

| Address | Lock bit | | High byte | Low byte |
|---|---|---|---|---|
| RID | 0 | ----- | Blocks to remove | Lock control |
| RID + 2 | 2 | | Head of blocks | |
| RID + 3 | 1 | | Tail of blocks | |
| RID + 4 | RmW | | ----- | Empty Blocks (12-bits) |

In a resource queue descriptor, the lock control field is a byte wide field containing bits for controlling write permission to other fields in the descriptor. The hardware includes an un-interruptible, read-modify-write sequence to ensure that only one function (portal 21–24 or software interface 20) can change the lock value at any given time. The lock bit column in the two tables indicate which bits control accesses to which fields. Lock bit 0 only applies to the 'blocks to remove' field. The lock control field can be modified while bit 0 is set.

The 'blocks to remove' field is a byte wide field which indicates the number of memory blocks which should be removed from the queue. This requires an access control lock since there are two functions that can modify the value. The software interface 20 can modify the value to request the queue length to be re-sized, and the re-allocation function then decrements the value as blocks are released.

The 'blocks to remove' field is only valid for single queues and resource queues-i.e. element queue descriptors, the field is unused. If blocks are to be removed from a grouped queue, the software interface 20 requests that they are removed from the resource queue rather than the element queues. If the 'blocks to remove' field is set to 255, all the blocks in the queue are removed as they go through a re-allocation. Here, the 'blocks to remove' value will not be reduced.

The 'block size' field is a 12-bit field, i.e. excluding the four control bits that indicate how many bytes of information can be written to the memory blocks used by the queue. The 'block size' field is modified only when the queue is created. While the queue is active, the 'block size' field is read only, and therefore doesn't require a lock. The element queue descriptors define the resource queue 'block size', which is the same for all elements in a grouped queue.

In place of the 'block size' field, resource queues have a 2-byte word wide 'head of blocks' field. The 'head of blocks' field contains the address of the memory block at the head of the chain of unused blocks. When a queue portal 21–24 loads an element queue, it locks the 'head of blocks' field of the associated resource queue. This ensures that, at any given time, only one element queue can use the associated resource queue. The queue portal then links the resource queue onto the element queue. The 'head of blocks' field of the resource queue being all 1s (=−1) indicates that the resource queue is empty. If the resource queue is empty, the queue portal immediately releases the resource queue by unlocking the 'head of blocks'. If the resource queue is not empty when the element queue is loaded, a queue portal 21–24 updates the 'head of blocks' field and releases the lock when it unloads a queue. When the queue is unloaded the 'head of blocks' field is loaded with all 1s (=−1), if there are no spare memory blocks.

The 'tail of blocks' field in a single queue is a word wide field containing the address of the last memory block to be added to the queue. The block re-allocation function uses this field to identify where released blocks should be linked back onto the tail of the queue. The 'tail of blocks' field points to the link field in the memory block at the tail of the queue. Since the re-allocation function is the only function that modifies the 'tail of blocks' field, lock control is not required. As all single queues must contain at least one memory block, the 'tail of blocks' field is always valid.

The 'tail of blocks' field in a resource queue is similar to the 'tail of blocks' in a single queue. However, a resource queue can become empty, which would make the 'tail of blocks' field invalid. The resource queue descriptor therefore includes an access control bit for the 'tail of blocks' field. When a queue portal 21–24 wants to unload an element queue, it firstly locks the 'tail of blocks' field in the associated resource queue descriptor, and then continues with the unload procedure. If the unload procedure has no spare blocks to pass back to the resource queue, it writes all 1s (=−1), to both the 'tail of blocks' and to the 'head of blocks'. The queue portal then unlocks both the 'head of blocks' and the 'tail of blocks' fields. The re-allocation function always locks the 'tail of blocks' field before it re-allocates blocks onto the resource queue.

The 'empty blocks' field is a byte wide field that indicates the number of spare (unused) blocks on the tail of a single queue, although some of the blocks may be used by an uncommitted write process which is still loaded). A single queue contains a maximum of 255 blocks, which enables the 'empty blocks' and 'used blocks' fields to be accessed together. The value in 'empty blocks' multiplied by the 'block size' gives a good approximation of the storage space (RAM) currently available, although this excludes any space available in the block which 'committed tail block' points to.

The 'empty blocks' and the 'used blocks' fields are modified using an un-interruptable, read-modify-write sequence rather than using a lock bit. When a queue portal 21–24 commits to write, it increases the value in the 'used blocks' field by the number of blocks being committed to, and decreases the value in the 'empty blocks' field by the same amount. When the re-allocation function adds a block to a queue, it increments the value in the 'empty blocks'.

The 'empty blocks' field of element queue descriptors is termed the 'used blocks threshold'. When an element queue is loaded for writing, the resource queue is usually linked onto the element queue. However, if the value in the 'used blocks' field is greater than the value in 'used blocks threshold' field, the resource queue is not appended to the element queue. The 'used blocks threshold' field can be used to prevent one element of a grouped queue using all the spare memory blocks.

The threshold is only applied when the queue is loaded. If an element queue is loaded with the resource queue, it can commit to any number of blocks, up to the number of blocks in the resource queue. These committed blocks are added to the 'used blocks' field even if the result is greater than the 'used blocks threshold'.

In grouped queues, a single 'empty blocks' count is kept in the resource queue. The 'empty blocks' field in an element queue is used to store the 'used blocks threshold' field. Since the grouped queue may need to keep track of more spare blocks, to service multiple element queues, the 'empty blocks' field in the resource queue descriptor is 12 bits instead of 8 bits long.

The 'empty blocks' field is updated using an un-interruptible read-modify-write sequence. When a queue portal commits to a write, it increases the value in the 'used blocks' field of the element queue descriptor by the number of blocks being committed to, and decreases the 'empty blocks' field of the resource queue descriptor by the same amount. When the re-allocation function adds a block to a queue, it increments the value in the 'empty blocks' field of the resource queue descriptor.

The 'used block' field is a byte wide field that indicates the number of memory blocks in the queue which contain data to be read and committed to. When a queue portal commits to a write, it increases the 'used block' count by the number of extra blocks added (using an un-interruptible, read-modify-write sequence). When a queue portal commits to a read, the number of blocks released is subtracted from the value in the 'used blocks' field. The 'used block' count is not used directly by the queue manager system 10. The 'used block' count is maintained so that external control functions can monitor and control how much data is stored in a queue. With element queues, there is complication in that a resource queue could supply more than 255 blocks to an element queue. This causes the 'used block' count to rollover, i.e. exceed the permitted maximum.

The 'type' field is a word wide field that distinguishes between single queues and element queues. The type field for single queues is all 1s (=−1). Any other value in the type field indicates the queue to be an element queue. For element queues, the type field contains the address of the associated resource identifier (RID).

The type field is treated as part of the write sub-descriptor, so is locked when a queue portal 21–24 loads the queue for writing. There are two occasions when the field is written to. When the queue is created, the software interface 10 sets up the type field. If the software interface 20 wants to destroy a grouped queue, it destroys all except one of the element queues. Then, with the last element queue, it chains the resource queue onto the element queue and converts the element queue into a single queue. The resource queue no longer exists, and the newly created single queue may be destroyed in the same way as other single queues are destroyed.

The 'committed tail block' field is a word wide field which is part of the pointer that identifies the location of the last committed write. The 'committed tail block' field contains the address of the start of the memory block in which the committed write occurred. The field is locked when a queue portal 21–24 loads a queue for writing. The queue portal 21–24 will load the committed pointer into a current tail pointer register, which is only valid while the queue is loaded. While writes occur, the current tail pointer is updated, but the committed tail pointer is unaffected. If the queue portal is told to commit written data, it loads the current tail pointer into the committed tail pointer. If the queue portal is told to discard the written data, it loads the committed tail pointer into the current tail pointer. When the queue portal unloads a write sub-descriptor, it always does either a commit or a discard operation first. Then, when the write sub-descriptor is unloaded, the write access control bit is unlocked.

The 'committed tail offset' field, which is the second part of the committed tail pointer, is a 12-bit field which is an offset from the start of the 'committed tail block' (until otherwise defined, the four MSBs are zero). The 'committed tail offset' field is essentially the same as the 'memory block length' field. Whenever the 'memory block length' field is updated, it is loaded with the current tail offset. The 'committed tail offset' field has a resolution of bytes, and excludes the four bytes of control information at the start of the memory block. The address where the last write commit occurred is given by 'committed tail block' field+4+ 'committed tail offset' field. All the queue pointers in the queue manager system 10 are pre-incremented, so the pointers point to the last write location rather than the next write location in the static state.

The 'current head block' field is a word wide field which is part of the read sub-descriptor. Unlike the write sub-descriptor, the read sub-descriptor can be unloaded without doing a commit/discard operation, since it may take longer to get feedback to indicate the data was transferred out of the queue manager system 10 successfully. In the case of received information that is written to the queue manager system 10, the data integrity check is usually part of the data stream, and so the check is done immediately after the data block is received. Therefore, the current head pointer is stored as well as the committed head pointer. The 'current head block' field contains the address of the start of the memory block in which the last read occurred.

When a queue portal loads a queue for reading, it locks the read sub-descriptor access control bit. It then loads the current head pointer into a register. Any read operations cause only the register value, not the value stored in RAM, to be updated. When a read commit occurs, the contents of the current head pointer register are copied into the committed head pointer in RAM. When a read discard occurs, the committed head pointer in RAM is copied into the current head pointer register. When the queue is unloaded, the current head pointer register is copied into the current head pointer in RAM, and the read sub-descriptor access control bit is unlocked. A read commit occurs when confirmation is received that the data was successfully transferred, and a read discard occurs otherwise.

The 'current head offset' field is the second part of the current head pointer. It is a 12-bit field that is an offset from the start of the 'current head block'. The current head offset field has a resolution of bytes, and excludes the four bytes of control information at the start of a memory block. The address where the last read operation occurred is given by 'current head block' field+4+'current head offset' field.

The 'committed head block' field is a word wide field that is part of the read sub-descriptor. The committed head block field contains the address at the start of the memory block at which the last read commit occurred. When a queue portal commits to a read and there is at least one memory block that can be released, the release procedure is triggered. The release procedure loads the queue identifier and value in the number of blocks to release field into the start of the data section of the memory block which the committed head block field points to. The address in the committed head block field is then passed to the released blocks queue ready for reallocation. The read commit procedure then completes by copying the current head pointer into the committed head pointer. When a read discard occurs, the committed head pointer is copied into the current head pointer.

The 'committed head offset' field is the second part of the committed head pointer. It is a 12-bit field that is an offset from the start of the committed head block. The field has a resolution of bytes, and excludes the four bytes of control information at the start of a memory block. The address where the last read commit occurred is given by 'committed head block' field+4+'committed head offset' field.

The 'blocks to release' field is a byte wide field which keeps track of the number of blocks which may be released when a read commit is done. The field is transferred into a register when the queue is loaded. When a read operation causes the current head pointer to advance to a new memory block, the blocks to release register is incremented. If a read commit is done, the blocks to release register is used by the release procedure. At the end of either a commit or a discard operation, the blocks to release register is reset to zero. When the queue is unloaded, the blocks to release register is reset to zero and copied into the blocks to release field in RAM.

The segmentation and re-assembly mechanism in the (QMS) 10 includes a means for indicating packet boundaries at different communication protocol levels. By storing the information in an efficient, generic format, devices using the queues are able to make decisions about joining and splitting packets without having knowledge of different packet formats. The four most significant bits (MSBs) of the 'block control' field are used to indicate boundaries in the data flow. These bits are hereafter referred to as control bits or flags.

The main purpose of the QMS 10 is to transfer data from one device to another, such as from a universal serial bus (USB) host interface (not shown) to a radio transceiver module (not shown). The USB host interface may constitute the queue user 'A' 11, and the radio transceiver module may constitute the queue user 'B' 12. A PC host (not shown) or some other host device is connected to the USB host interface 11. At the USB host interface 11, the data is put into the payload section of an L2CAP packet which has the following format:—

2-byte Connection ID
2-byte Protocol/Service Multiplexer
0 to 65533 bytes of Payload Data The L2CAP packet is put by the USB host interface 11 into one or more 'host controller interface' (HCI) packets, where a HCI packet has the following format:—

12-bit Connection Handle, + 2-bit Packet Boundary, + 2-bit Broadcast Type
2-byte Length Field
0 to 65533 bytes of Payload Data Each HCI packet is then formed into one or more USB packets, where a USB packet consists of:—

8-BIT Data transfer token indicating data direction
7-bit address + 4-bit endpoint to identify Bluetooth data connection
5-bit checksum
8-bit Data transfer toggle (to ensure no data lost)
Payload Data (HCI fragment)
16-bit checksum The extra USB information is used to ensure that data is transferred from the host correctly, but is not stored. The extra USB information is extracted by the USB host interface 11, which transfers the remaining USB payload to the queue user interface 15. If the USB payload is the start of an HCI packet, the queue user interface 15 extracts the first 4 bytes of HCI packet header, and transfers the remainder of the payload to the QMS 10. If a USB packet is the start of a HCI packet, the first two bytes of the HCI packet are used by the queue user interface 11 to decide which queue to store the data in. Included in the first two bytes are 2-bits which indicate if the HCI packet is the start or continuation of an L2CAP packet. If it is the start of an L2CAP packet, bit 2 of the 4-bit flag field maintained by the QMS 10 is set by the queue user interface 11. The QMS 10 is informed of the start of different packets by the USB host interface through the use of pre-defined instruction codes. If the USB packet contains the start of the HCI packet, bit 3 of the 4-bit flag field maintained by the QMS 10 is set. If the USB packet contains a continuation of an HCI packet, no flags are set. The flags are constituted by the four bits adjacent to the block size field in the memory blocks which form the queue.

As USB packets are transferred, the payload (excluding the 4-bytes of HCI packet header) is stored in the queue. At the end of every good USB packet transfer, the data in the queue is committed. If the data transfer fails, the data is discarded.

At the radio transceiver module 12 side of the queue, the start of an L2CAP message is at the start of a radio packet.

However, HCI packet boundaries do not have to be maintained. Therefore, a radio packet could be made up of a fragment of a HCI packet, or it could contain multiple HCI packets. A radio packet starts with a 2-bit field, which indicates if it is the start or continuation of an L2CAP packet. There is then a flow bit (which indicates whether the radio can receive data), and either a 5-bit or 9-bit length field, depending on the type of packet used. Although the radio transceiver module 12 is not concerned with HCI packet boundaries, it counts how many HCI packets have been successfully sent, and informs the PC host through the QMS 10 how many more packets it can download. By virtue of the packet boundary flags managed by the queue manager system 10, the radio transceiver module does not need the capability to decode HCI and L2CAP packets.

When the radio transceiver module 12 receives packets, it sets bit 3 of the 4-bit flag field maintained by the QMS 10, to indicate the start of a radio packet, by generating the appropriate instruction code. If the packet header indicates it is the start of an L2CAP packet, bit 2 is also set. The length field of the radio packet is discarded by the radio transceiver module. The payload data is stored in the queue associated with the link or channel that the packet was received on.

The host side of the queue ignores radio packet boundaries, and creates HCI packets up to an L2CAP packet boundary. In order to do this, the host has a pre-set maximum HCI packet size. The host asks the QMS 10 how much data there is from the current pointer to either the end of the queue, or the next point at which bit 2 of the 4-bit field is set, or until there is enough data to fill a HCI packet size. The host then builds an HCI packet header, using a connection handle that is associated with the queue, and L2CAP start or continuation flags based on the control flags, and the length field based on how much data is available.

For a USB interface, the HCI packets are further broken down into USB packets, where all data packets use the same USB address and endpoint.

What is claimed is:

1. A data queue system comprising:

plural memory blocks defined in memory;

a data queue comprising a number of memory blocks, each non-final memory block including a link to the following block in the data queue; and, a queue descriptor stored in memory, the queue descriptor comprising:

a first identifier identifying the final block in the queue;

a second identifier identifying the memory location where the most recent read commit occurred; and, a third identifier identifying the memory location where the most recent write commit occurred.

2. A data queue system as claimed in claim 1, in which the second identifier comprises an identifier identifying the memory block where the most recent read commit occurred and another identifier identifying an offset from a predetermined location in that memory block.

3. A data queue system as claimed in either preceding claim, in which the third identifier comprises an identifier identifying the memory block where the most recent write commit occurred and another identifier identifying an offset from a predetermined location in that memory block.

4. A data queue system as claimed in claim 1, in which the queue descriptor further comprises a lock control field which indicates whether a function has write access to the data queue.

5. A data queue system as claimed in claim 1, in which the queue descriptor further comprises an identifier identifying the size of the memory blocks.

6. A data queue system as claimed in claim 1, in which the queue descriptor further comprises an identifier identifying the memory location where the most recent write occurred.

7. A data queue system as claimed in claim 1, in which the queue descriptor further comprises an identifier identifying the number of unused blocks associated with the data queue.

8. A data queue system as claimed in claim 1, in which the queue descriptor further comprises an identifier identifying the number of memory blocks associated with the data queue which contain data to be read.

9. A data queue system as claimed in claim 1, in which the queue descriptor further comprises an identifier identifying the type of data queue.

10. A data queue system as claimed in claim 1, in which the queue descriptor further comprises an identifier identifying the memory location where the most recent read occurred.

11. A data queue system as claimed in claim 1, in which the queue descriptor further comprises an identifier identifying the number of memory blocks which have been read since the most recent read commit.

* * * * *